United States Patent [19]
Wirtz et al.

[11] Patent Number: 5,170,040
[45] Date of Patent: Dec. 8, 1992

[54] DEVICE FOR SUPPLYING ENERGY TO A HEATED WINDOW PANE FROM AN ELECTRICAL NETWORK OF A MOTOR VEHICLE

[75] Inventors: Rainer Wirtz, Unterriexingen; Wunibald Frey, Schwieberdingen; Ralph-Gebhard Renk, Wertheim, all of Fed. Rep. of Germany

[73] Assignee: Robert Bosch GmbH, Stuttgart, Fed. Rep. of Germany

[21] Appl. No.: 605,116

[22] Filed: Oct. 26, 1990

[30] Foreign Application Priority Data

Dec. 22, 1989 [DE] Fed. Rep. of Germany ....... 3942593

[51] Int. Cl.⁵ .............................................. H05B 1/02
[52] U.S. Cl. .................................... 219/497; 219/203; 219/501; 219/10.77; 219/10.493
[58] Field of Search ............... 219/497, 494, 491, 501, 219/202, 203, 10.75, 10.77, 10.493, 211

[56] References Cited

U.S. PATENT DOCUMENTS

| | | | |
|---|---|---|---|
| 3,887,781 | 6/1975 | Peters, Jr. ........................ | 219/10.77 |
| 4,277,672 | 7/1981 | Jones .................................. | 219/497 |
| 4,357,524 | 11/1982 | Apfelbeck et al. ................ | 219/203 |
| 4,434,358 | 2/1984 | Apfelbeck et al. ................ | 219/203 |
| 4,620,084 | 10/1986 | Cunningham et al. ............ | 219/497 |
| 4,996,405 | 2/1991 | Poumey et al. ................... | 219/10.67 |

Primary Examiner—Mark H. Paschall
Attorney, Agent, or Firm—Michael J. Striker

[57] ABSTRACT

The device for energizing a heating element of a window pane from a direct current network of a motor vehicle includes a converting device for converting the d.c. voltage of the direct current network into an alternating current voltage of a predetermined frequency and a resonant circuit connected to the output of the converting device having a Q-factor high enough to produce a low number of harmonics in operation. The resonant circuit has a resonant frequency corresponding to that of the alternating current voltage. The heating element is a part of a resistance of the resonant circuit. The converting device can include a control circuit for producing alternating control signals, a base driving circuit controlled by the control signals and having two outputs connected respectively to a base of a switching transistor. The device can also include a protecting circuit for picking up energy during opening of the respective switching transistors and returning the picked-up energy to the d.c. network.

8 Claims, 4 Drawing Sheets

DEVICE FOR SUPPLYING ENERGY TO A HEATED WINDOW PANE FROM AN ELECTRICAL NETWORK OF A MOTOR VEHICLE

BACKGROUND OF THE INVENTION

The present invention relates to a device for energizing by means of a DC/AC converter a heating element of a window pane from a direct current network of a motor vehicle.

To improve the electrical power supply of a heating element, for example the heating resistor of a windshield in a motor vehicle, different solutions are known for achieving a higher heating efficiency.

From the DE-OS 37 43 316 a power supply network for a motor vehicle is known which, among other functions, also supplies energy to a heatable window pane. For this purpose, an alternating current (a.c.) voltage of 80 V maximum and at a frequency of 50 Hz is produced by means of a converter and applied via an intermediate voltage coupling circuit to the heating element of the pane. However, this prior art network system fails to provide any measures for generating an a.c. heating voltage at a given frequency which would reliably meet anti-interference regulations.

From the DE-OS 26 42 028 known is the generation of an alternating current voltage from a direct current voltage by means of a resonant circuit, for example a parallel resonant circuit. In order to deliver an a.c. power at higher frequencies, the source of d.c. voltage is coupled to the load via the resonant circuit whereby an electronic switching element, for instance a switching semiconductor is connected between the d.c. voltage source and the resonant circuit. An inductance is connected in series with the switching semiconductor element. With such an alternating current generator, also called a resonant converter, the inductive heating of a resistor, for example, can be achieved. This known resonant converter also fails to meet the anti-interference requirements.

SUMMARY OF THE INVENTION

A general object of the present invention is to avoid the disadvantages of the prior art DC/AC converters of this kind, when used for energizing a heating element of a window pane in a motor vehicle.

In particular, an object of the invention is to provide an improved device for supplying energy from the d.c. network to the heated pane in such a manner that the heating element of the pane is supplied with a heating current at a predetermined frequency selectable in a frequency range which has no polarization effects in the pane.

Another object of the invention is to meet protective regulations against interferences by reducing harmonics content in the converted a.c. voltage.

Still another object of the invention is to provide a conversion of the d.c. network voltage at a high power consumption, e.g. in a range up to the kilowatt, with a minimum power loss. In d.c. networks having a higher voltage then the standard voltage for motor vehicles, for example 24 V or 48 V, a still better heating efficiency is achievable.

In keeping with these objects and others which will become apparent hereafter, one feature of the invention resides in the provision of a resonant circuit connected to the output of the d.c./a.c. converter of the network and having a resonant frequency matching that of the converted alternating current; and the heating element of the window pane being coupled to the output of the converter as a component part of the resistance of the resonant circuit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
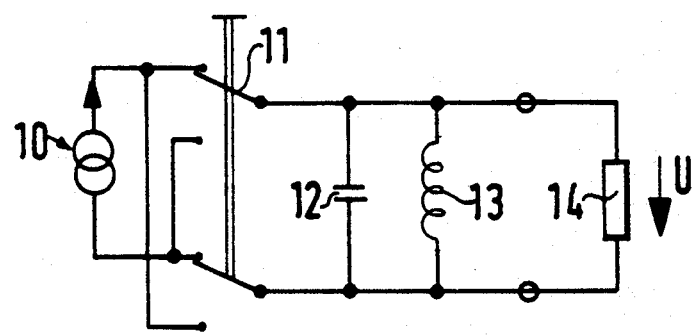
FIG. 1 shows the basic connection of a resonant converter with a current-controlled parallel resonant circuit.

The basic construction of a device of the invention shown in FIG. 1 includes a direct current source 10, connectable via a switch 11 to a parallel resonant circuit consisting of a capacitor 12, a coil 13 and an ohmic resistance 14 whose component part is the ohmic resistance of a consumer device, in this example the heating element of a window pane. The direction of current from the source 10 is alternately switched over by the switch 11 in synchronism with the resonant frequency of the resonant circuit 12, 13, 14 and, provided that the quality factor of the resonant circuit is sufficiently high, a sine-shaped voltage U having a low proportion of harmonics, is generated across the consumer device 14.

Figure 2:
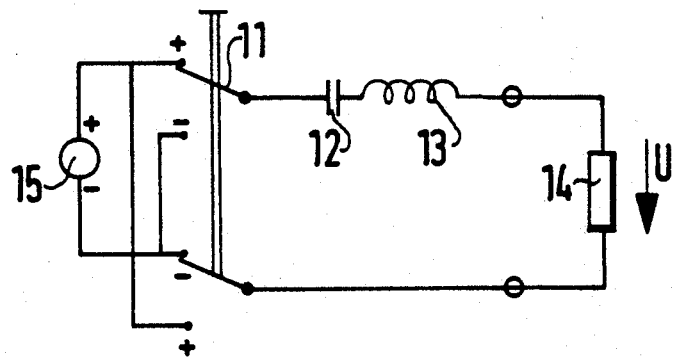
FIG. 2 shows the basic connection of a resonant converter with a voltage controlled series resonant circuit.

In the case of a series resonant circuit 12, 13, 14, illustrated in FIG. 2, the terminals of a d.c. voltage source 15 are alternately switched-over by the switch 11 in synchronism with the resonant frequency of the series resonant circuit. Consequently, the rectangular alternating voltage applied to the series resonant circuit 12–14, provided that the latter has a sufficiently high quality factor, is converted into a sine voltage U with a low proportion of harmonics occurring across the resistance 14 whose component part is the heating resistor of a window pane.

Figure 3:
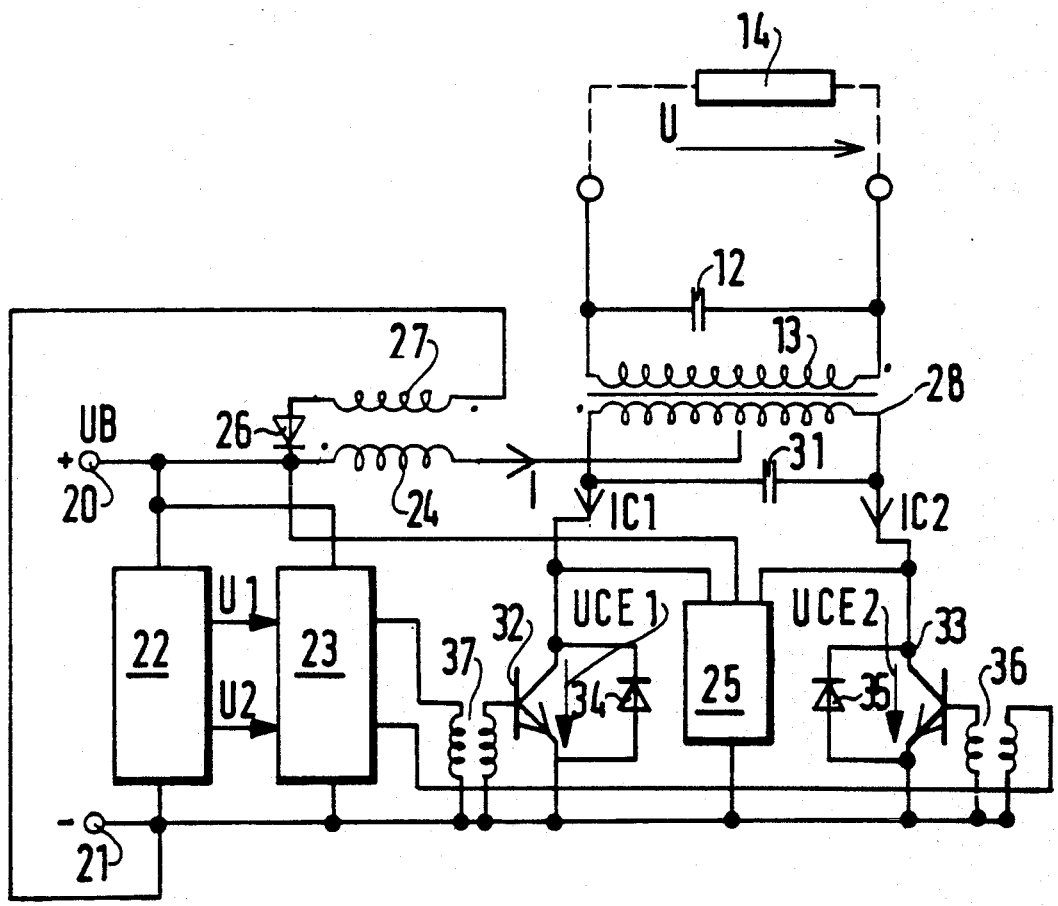
FIG. 3 shows a more detailed embodiment of a device of the invention including a current controlled parallel resonant circuit.

A more detailed embodiment of a device employing a current controlled parallel resonant circuit is illustrated in FIG. 3. A d.c. voltage UB of a power supply network of a motor vehicle is applied to a plus terminal 20 and a minus (ground) terminal 21. Between the terminals 20 and 21 are connected an electronic control circuit 22, a base driving circuit 23, and a protecting circuit 25.

A center tap of the primary winding 28 of an output transformer 28, 13 is connected via a primary winding 24, serving as a choke, of a transformer 24, 27, with the plus terminal 20. The secondary winding 27 of the transformer 24, 27 can, at one end thereof, be connected via a diode 26 to the plus terminal 20 and, at the other end, to the ground terminal 21. The secondary winding 13 of the output transformer 13, 28 forms the coil or inductance of a parallel resonant circuit including a capacitor 12 and a load resistor 14, i.e. the resistance of a heating element of a window pane across which a harmonics-free sine voltage U is to be applied.

The ends of the primary winding 28 are bridged by a capacitor 31 and are connected, respectively, via collector-emitter paths of switching power transistors 32 and 33 to the ground terminal 21. The collector-emitter paths of the two switching transistors 32 and 33 are bridged by diodes 34 and 35 whose anodes are connected to the ground terminal 21. The base electrodes of the transistors 32 and 33 are coupled via transformers 36 and 37 to the assigned outputs of the base driving circuit 23.

The operation of the device of FIG. 3 is as follows:

The primary (choke) winding 24 passes a current I from the terminal 20 of the d.c. network to the tapping point of the primary winding 28 wherefrom the current alternately flows through the respective halves of the primary winding 28 and the alternately switched-on transistors 31, 33 to the ground terminal 21. The transformer ratio of the secondary winding 13 of the push-pull operating output transformer 13, 28 is adjusted to the required voltage U across the load resistor 14 and thus to the nominal power consumption of the load resistor 14. The total inductance of the output transformer represents the inductive component of the parallel resonant circuit 12, 13 and 14, similarly as the coil 13 in FIG. 1.

The switching transistors 32 and 33 can be realized as bipolar- or MOS power transistors; whereby the requirement of a low trigger voltage is decisive as a selection criterium. The illustrated single-stage bipolar switching transistors coupled to the base driver circuit 23 via power-matching transformers 36 and 37 for high switching currents, represent a particularly cost-effective solution.

If a control of the output power is required the secondary winding 27 is connected via a diode 26 with the primary (choke) winding 24 to serve as a demagnetizing auxiliary winding.

The capacitor 12 of the parallel resonant circuit can be connected also across the primary winding or distributed both across the primary and secondary windings, depending on the desired matching of current- and voltage ratios predetermined by the transformer voltage ratio of the windings 13 and 28. In the illustrated embodiment, capacitor 12 represents a secondary winding component and capacitor 31 a primary winding component of the total capacitance of the parallel resonant circuit.

The protective circuit 25 takes over the electromagnetic energy stored in the stray-inductance of the output transformer 13, 28 and released by the action of the switching power-transistors 32 and 33. In addition, the circuit 25 serves for discharging the current flowing through the primary (choke) coil 24 after turning off the device in the case when no output power control is provided, that means in the absence of the secondary winding 27 and the diode 26. The picked-up stray energy can be returned to the power supply network.

Preferably, the transistors 32 and 33 switch on during a zero-voltage crossing in order to minimize switching losses.

The control circuit 22 delivers the alternating control signals U1 and U2 generated by a free-running oscillator. The current flow phase-angle of the respective switching transistors 32 and 33 is 180°, whereby when operating without the secondary winding 27 and the diode 26, the control circuit 22 during the commutation must ensure an overlapping of the control signals U1 and U2.

When the demagnetizing current branch with the secondary winding and the diode 26 is used, a control of the output power from a zero to a maximum value can be achieved by setting a current flow phase angle which is less than 180°. During a time $t_{off}$ at which both switching transistors 32 and 33 are simultaneously blocked, a negative product of voltage (IB) × time ($T_{off}$) is applied to the input of the primary (choke) winding 24. The diodes 34 and 35 serve for conducting the reverse current generated during the commutation of the two transistors 32 and 33. If MOS-transistors are used, the diodes 34 and 35 are built-in the respective power transistor structures.

Figure 5:
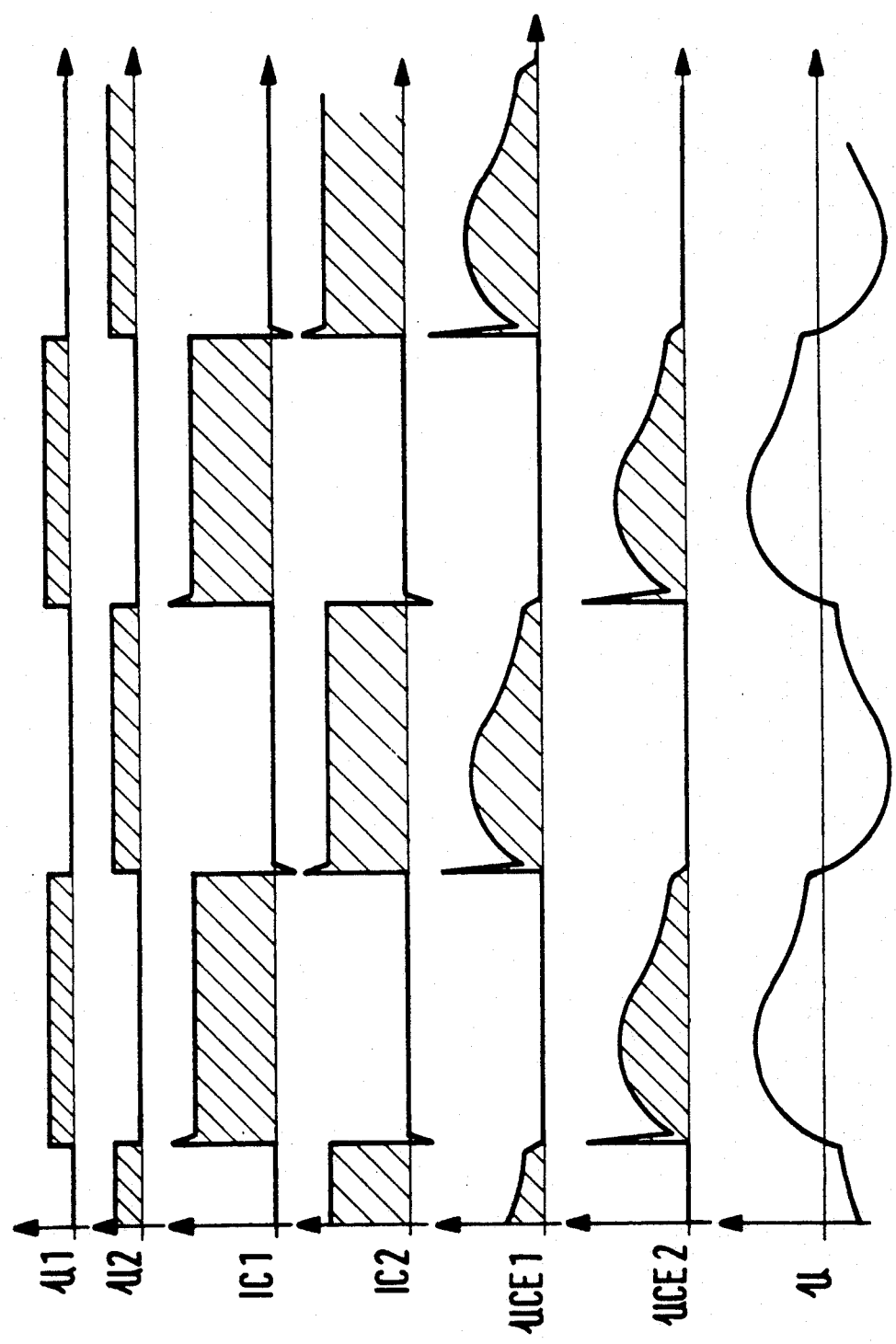
FIG. 5 shows time plot diagrams of currents and voltage in the embodiment of FIG. 3.

FIG. 5 illustrates voltage and current waveforms occurring during the operation of the device of FIG. 3 wherein the current controlled parallel resonant circuit has a quality factor Q=0.5. The alternating control voltages U1 and U2 generated at the outputs of the control circuit 22 have a rectangular wave-form. The corresponding currents IC1 and IC2 in the collector-emitter paths of the controlled switching transistors 32 and 32 have also an almost rectangular waveform. The course of corresponding voltages UCE1 and UCE2 resulting across the respective collector-emitter paths is not rectangular but approximates sine-like half-waves. Accordingly, the alternating currents IC1 and IC2 induce in the secondary winding 13 of the output transformer 13, 28 an approximately sine-shaped voltage U which is applied to the load resistor 14, i.e. to the heating element of the window pane.

Figure 4:
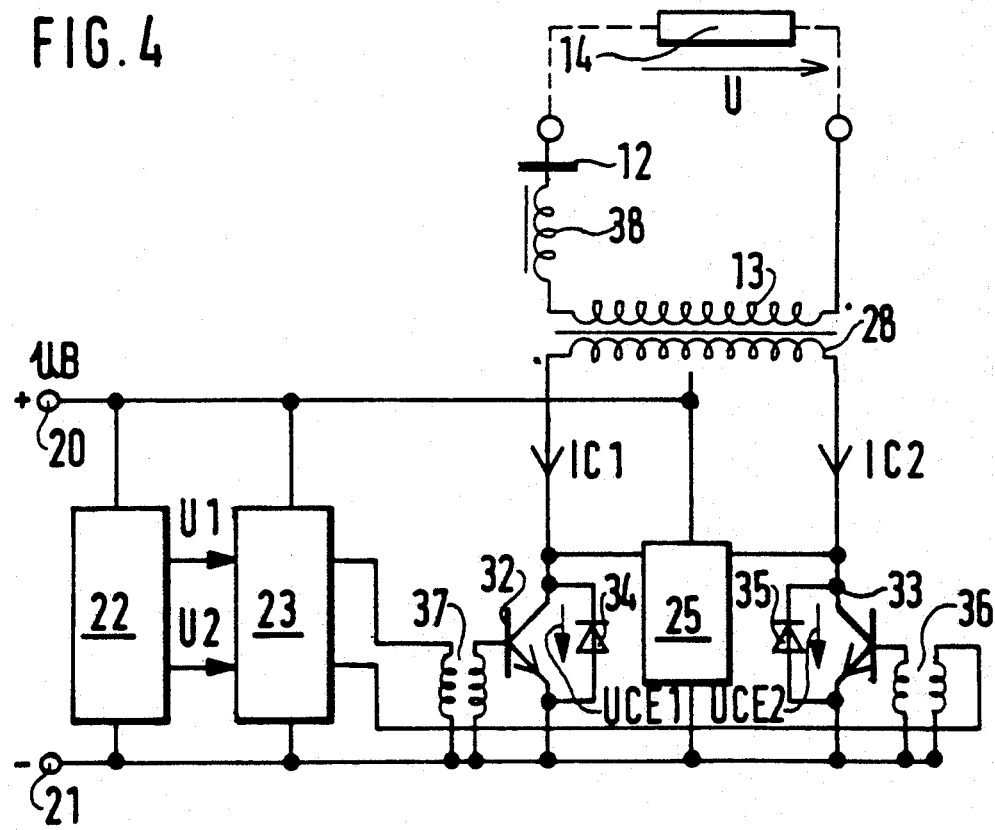
FIG. 4 shows a more detailed embodiment of a device of the invention including a voltage controlled series resonant circuit.

In FIG. 4, there is illustrated an embodiment of a device for energizing an ohmic heating element 14 of a window pane via a series resonant circuit. The connections of the electronic control circuit 22, the base driving circuit 23 and the protection circuit 25 to the network terminals 20, 21, as well as the connection of the switching power transistors 32 and 33 the diodes 34, 35 and the matching transformers 36 and 37, are the same as in the embodiment of FIG. 3.

The positive terminal 20 to which a d.c. voltage UV is applied is connected directly to the center tap of the primary winding 28 of the output transformer. The secondary winding 13 of the transformer is connected in series with an inductance or coil 38, a capacitor 12 and the ohmic load resistance 14 (the heating element of the window pane). The secondary winding 13 and the coil 38 form together the total inductance of the series resonant circuit.

In operation, the d.c. voltage UB is applied directly via the alternately switching transistors 32 and 33 to the primary winding 28 tapped for a push-pull mode of operation of the transformer 13, 28. The transformer voltage ratio of the output transformer is again adjusted with respect to a desired output power such that a requisite maximum output voltage U is achieved.

The function of the base driving circuit 23 corresponds to that according to FIG. 3. The protection circuit 25 takes over the energy released by stray inductance of the output transformer during the switching action, and returns the energy at least partially to the d.c. network.

The output power can be continuously adjusted by varying the switch-on ratio of the control signals U1 and U2 and thus the current flow phase angle of the switching transistors 32 and 33 between 0 and 180°. By contrast to the embodiment of FIG. 3 where a heavy duty choke coil 24 is necessary for high current flows, this embodiment needs only a small size coil 13 (a secondary winding choke). On the other hand, a disadvantage of this construction is a less effective current utilization by the power transistors 32 and 33, because their collector current has the form of half waves and, therefore, the transistors must be dimensioned for the peak current values.

At the maximum power output, i.e. with the current flow phase angle of 180°, the two power transistors switch over during the zero current crossing. Consequently, minimum switching losses take place and the base driving circuit 23 can operate with a low power consumption. At current flow phase angles smaller than 180°, the respective collector currents commute to an opposite diode 34 or 35 which acts as an inverted diode.

Figure 6:
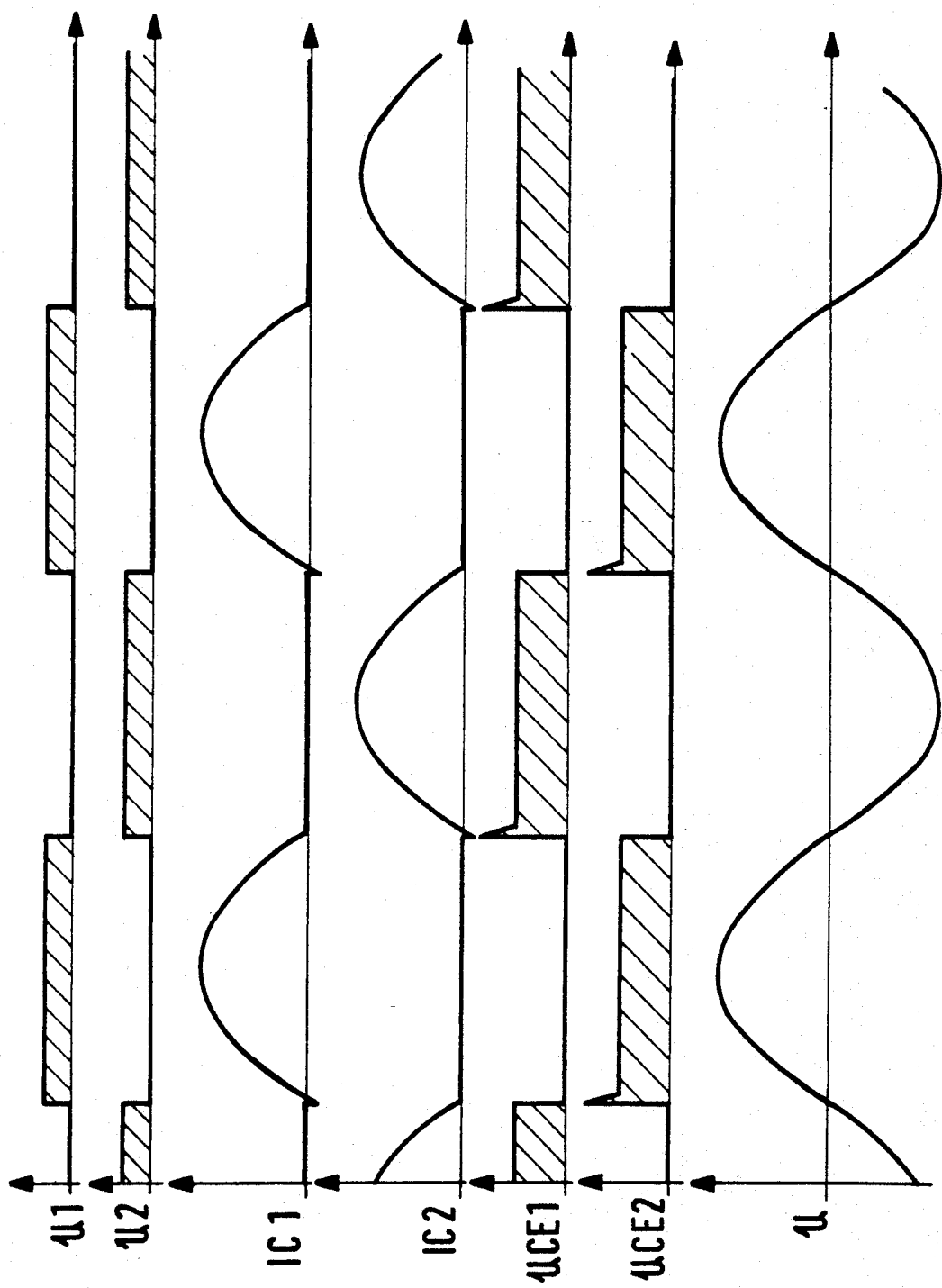
FIG. 6 shows time plot diagrams of currents and voltages in the embodiment of FIG. 4.

The relationship between currents and voltages occuring in the embodiment of FIG. 4 is illustrated in the time diagrams of FIG. 6.

The control circuit 22 delivers two successions of rectangular pulses U1 and U2 of opposite phase for controlling the base driving circuit 23. As long as the control signal U1 or U2 is higher than zero, a sine-shaped current half-wave IC1 flows through the collector-emitter path of the transistor 32 or 33 followed by a substantially rectangular collector-emitter voltage UCE1 or UCE2.

At the secondary coil 13 of the output transformer 13, 28 the higher harmonic components of the induced rectangular voltages are filtered out by the action series resonant circuit 38, 12 and, consequently, a substantially sine-shaped voltage U is applied across the ohmic resistor 14 of the series resonant circuit whose component part is the heating element of a window pane. The sine waveform of the voltage U shown in FIG. 6 was generated with a voltage controlled series resonant circuit having a quality factor Q=2.

For the power supply of a heating element of a window pane, the design of the resonant converter in either embodiment is such that at a desired power output up to 1.5 kilowatt a minimum power loss is achieved and even at a minimum d.c. voltage UB=10 V of the network an efficiency greater than 80% is reached. This is made possible by the full utilization of the available network voltage by the push-pull output transformer and the switching power transistors operate at a low voltage for the given current, for example the parallel connection of two MOS- or bipolar transistors driven by a transformer-coupled base driving circuit.

In order to meet anti-interference regulations, the dimensions and design of the RLC-resonant circuit whose component part is the ohmic resistance of the pane heating element, must provide a sufficient quality factor Q for achieving a sine-shaped voltage having a low number of harmonics.

Normally, the device of this invention is employed in electrical networks of motor vehicles operating at a voltage UB=12 V. A hearing element whose resistance is in the range of one ohm would require an a.c. voltage between 20-100 V in order to obtain the requisite heating power. The frequency of the voltage is selectable within a broad range, for example 50 kHz to be outside audible frequencies. In principle, the magnitude and frequency of the heating voltage can be adjusted to particular operational requirements.

If the device of the invention operates in a network having a higher voltage, for example 24 or 48 V, a corresponding increase of the output power available for the heating element 14 is obtained substantially at the same losses as with a lower voltage.

While the invention has been disclosed in specific examples of the preferred embodiments, it is not intended to be limited to the details shown, since various modifications and changes can be made without departing in any way from the spirit of the present invention.

We claim:

1. A device for energizing a heating element of a window pane from a direct current network of a motor vehicle, comprising means for converting a direct current voltage of the direct current network into an alternating current voltage of a predetermined frequency; and a resonant circuit connected to the converting means and having a resonant frequency corresponding to the predetermined frequency of the alternating current voltage; wherein a heating element of a window pane of a motor vehicle is a component part of a resistance of the resonant circuit and the resonant circuit has a quality factor high enough to produce a low number of harmonics in the resonant circuit.

2. A device as defined in claim 1, wherein the resonant circuit is a parallel circuit including a coil, a capacitor and an ohmic resistance; and the heating element being connected parallel to the ohmic resistance.

3. A device as defined in claim 1, wherein the resonant circuit is a series circuit including a coil, a capacitor and the heating element.

4. A device as defined in claim 1, wherein the quality factor of the resonant circuit is in a range at which the a.c. voltage applied to the heating element has a sine shape with a low number of harmonics.

5. A device as defined in claim 1, wherein the converting means includes a resonant converter which comprises a control circuit for producing alternating control signals (U1, U2), a base driving circuit (23) controlled by the control signals and having two outputs connected respectively to a base of a switching transistor.

6. A device as defined in claim 5, further comprising a protecting circuit (25) for picking up energy during opening of the respective switching transistors and returning the picked-up energy to the d.c. network.

7. A device for energizing a heating element of a window pane from a direct current network of a motor vehicle, comprising means for converting a direct current voltage of the direct current network into an alternating current voltage of a predetermined frequency; and a resonant circuit connected to the converting means and having a resonant frequency corresponding to the predetermined frequency of the alternating current voltage; wherein a heating element of a window pane of a motor vehicle is a component part of a resistance of the resonant circuit and the resonant circuit has a quality factor high enough to produce a low number of harmonics in the resonant circuit; and wherein the converting means includes two switching transistors each having a base, a control circuit for producing alternating control signals, a base driving circuit controlled by the control signals and having two outputs connected to the bases of the switching transistors.

8. A device as defined in claim 7, further comprising a protecting circuit for picking up energy during opening of the respective switching transistors and returning the picked-up energy to the direct current network.

* * * * *